(12) United States Patent
Gaiani

(10) Patent No.: US 7,192,255 B2
(45) Date of Patent: Mar. 20, 2007

(54) DEVICE FOR MOUNTING BLADES ON A PROPELLER HUB WITH PRELOADING OF THE BEARINGS

(75) Inventor: Robert Gaiani, Figeac (FR)

(73) Assignee: Ratier-Figeac, Figeac (FR)

( * ) Notice: Subject to any disclaimer, the term of this patent is extended or adjusted under 35 U.S.C. 154(b) by 0 days.

(21) Appl. No.: 11/190,066

(22) Filed: Jul. 26, 2005

(65) Prior Publication Data
US 2006/0093486 A1    May 4, 2006

(30) Foreign Application Priority Data
Jul. 26, 2004    (FR) ................... 04 08238

(51) Int. Cl.
*B64C 11/06* (2006.01)
(52) U.S. Cl. .................. 416/205; 416/204 R; 416/207; 416/209
(58) Field of Classification Search ............ 416/204 R, 416/205, 206, 207, 208, 209, 220 A; 384/517, 384/538, 566
See application file for complete search history.

(56) References Cited

U.S. PATENT DOCUMENTS

| | | | |
|---|---|---|---|
| 4,850,801 A | 7/1989 | Valentine | ............ 416/205 |
| 5,118,256 A | 6/1992 | Violette et al. | ......... 416/134 R |
| 6,015,264 A | 1/2000 | Violette et al. | ......... 416/146 A |
| 6,082,907 A | 7/2000 | Arvidsson | .............. 384/563 |
| 6,213,719 B1 | 4/2001 | Violette et al. | ........... 416/205 |
| 6,220,820 B1 * | 4/2001 | Godwin | .................. 416/205 |

FOREIGN PATENT DOCUMENTS

| | | |
|---|---|---|
| EP | 0 822 137 A | 7/1997 |
| GB | 485 102 | 5/1938 |
| GB | 2251896 A * | 7/1992 |

OTHER PUBLICATIONS

French Preliminary Search Report dated Mar. 2, 2005 (Examiner: Estrela y Calpe, J).

* cited by examiner

*Primary Examiner*—Edward K. Look
*Assistant Examiner*—Dwayne J White
(74) *Attorney, Agent, or Firm*—Ohlandt, Greeley, Ruggiero & Perle, L.L.C.

(57) ABSTRACT

This device for mounting a propeller blade in a hub, of the type in which a blade base is mounted in rotation in a hub housing by means of at least two bearings and where a preloading device permitting axially preloading the two bearings comprises a holding ring mounted between one of the two bearings and hub so as to allow an axial displacement of ring relative to hub, in that holding ring is mounted rotatingly between bearing and hub by means of rolling elements and helical tracks arranged to drive an axial displacement of ring during rotation of this ring, means being provided to cause ring to rotate according to a predefined law.

7 Claims, 3 Drawing Sheets

DEVICE FOR MOUNTING BLADES ON A PROPELLER HUB WITH PRELOADING OF THE BEARINGS

BACKGROUND OF THE INVENTION

1. Field of the Invention

The present invention concerns a reversible preloading device for bearings for mounting blades on a propeller hub.

2. Description of Related Art

Propellers for turbo-prop airplanes require a maximum degree of operation. For this, there are systems for holding the blades on the hub whose principle permits rapid disconnection from and reconnection to the plane without having to remove the propeller.

Two types of solutions exits.

The first, used on propellers of type 24F, 568F and NP2000, consists of having one or more rows of ball bearings, which are preloaded automatically by centrifugal force when the propeller is placed in rotation.

When the power of the propeller increases and when the forces on the blade became great, a second type of solution is used that consists of preloading the bearings of the blade base, as shown, for example, in document U.S. Pat. No. 4,850,801. However, in these solutions, there is a risk of great variation of the preloading and it may even be lost due to the rigidity of the system and thermal variations; on the other hand, all the parts coming in contact are subjected to vibration, with risks of contact wear ("fretting" in English). Document U.S. Pat. No. 5,118,256 discloses an improvement using an elastomer block for preloading to partially eliminate these problems, but the system has a limited service life, inducing high maintenance costs. Moreover, these solutions have another major defect, i.e., the necessity of having complex disconnection tools.

In order to alleviate this defect, document U.S. Pat. No. 6,213,719 proposes having recourse in an entirely different system of blade mounting, i.e. mounting by pins.

SUMMARY OF THE INVENTION

The object of the invention is to alleviate the defect observed while conserving the general architecture for installation of blades on the propeller hub.

The invention achieves its object by means of a device for mounting a propeller blade on a hub of the type in which a blade base is mounted in rotation in a housing of the hub by means of at least two bearings, and in which a preloading device that permits axially preloading the two bearings comprises a holding ring mounted between one of the two bearings and the hub so as to allow axial displacement of the ring in relation to the hub, characterized in that the holding ring is mounted in a rotating manner between one of the two bearings and the hub by means of rolling elements an helical tracks, arranged to bring about an axial displacement of the ring during its rotation, means being provided to induce the rotation of the ring according to a predefined law.

Advantageously, these means are made in one piece with the hub. They comprise a mobile support element being supported, preferably tangentially on the ring to continuously cause its rotation. For example, the support element is supported on a radial extension of the ring. This support element can be caused to rotate by an elastic element or by a servomotor. In all cases, it involves a component that is insensitive to variations in the dimensions or temperatures of the bearings to be preloaded.

The device for blade mounting according to the invention permits rapid installation on the wing of the airplane without complex equipment.

BRIEF DESCRIPTION OF THE DRAWINGS

Other characteristics and advantages of the invention will appear upon reading one embodiment of the invention. We will refer to the attached drawings in which.

DETAILED DESCRIPTION OF THE INVENTION

Figure 1:
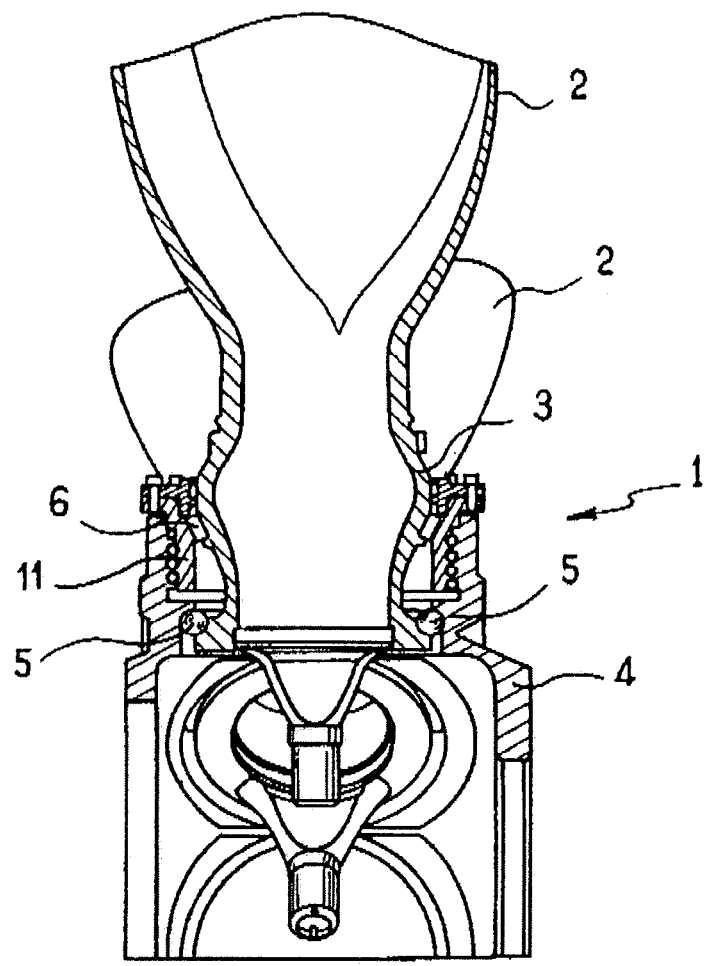
FIG. 1 shows the installation of a blade base in the propeller hub in radial section.

A propeller 1 comprises several blades 2 whose base 3 is installed in an appropriate housing of a hub 4. Base 3 rotates in the hub housing by means of two bearings: a ball bearing 5 and a conical roller bearing 6. Ball bearing 5 is interposed between two appropriate tracks 7, 8 arranged in oblique opposition, respectively, on base 3 and hub 4. Conical roller bearing 6 is interposed between two appropriate tracks 9 and 10, arranged in oblique opposition, respectively, on base 3 and a holding ring 11 is supported against hub 4.

Figure 2:
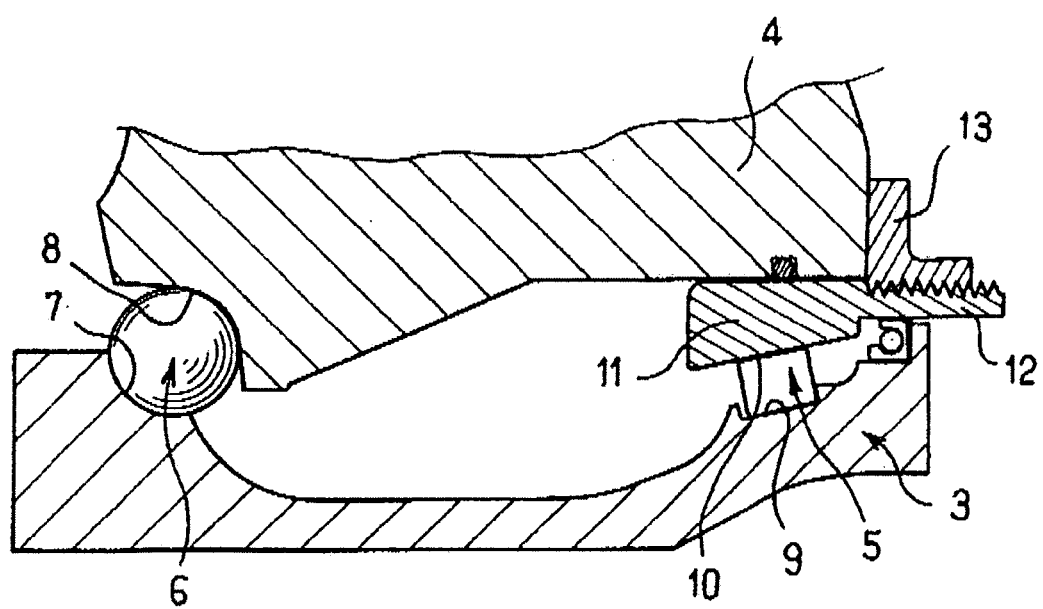
FIG. 2 schematically shows in section a preloading device of the prior art.

A holding ring of the prior art is shown in detail in document U.S. Pat. No. 5,118,256, to which reference is made. Another example of a holding ring of the prior art is shown in FIG. 2 of the present application. It comprises a threaded terminal part 12 onto which a screw ring 13 can be screwed, coming to be supported on one bearing surface of hub 4. By screwing on ring 13, holding ring 12 can be moved axially and bring about relative preloading of bearings 5, 6 by wedge effect in cooperation with conical bearings 5.

Figure 3:
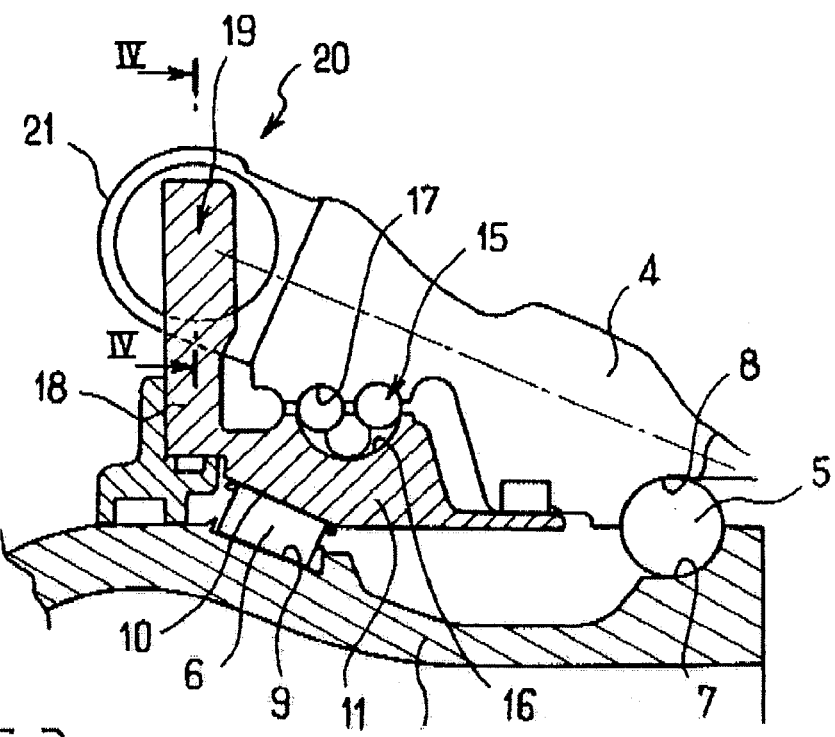
FIG. 3 is a view analogous to that of FIG. 2, showing the preloading system conforming to the invention.
Figure 4:
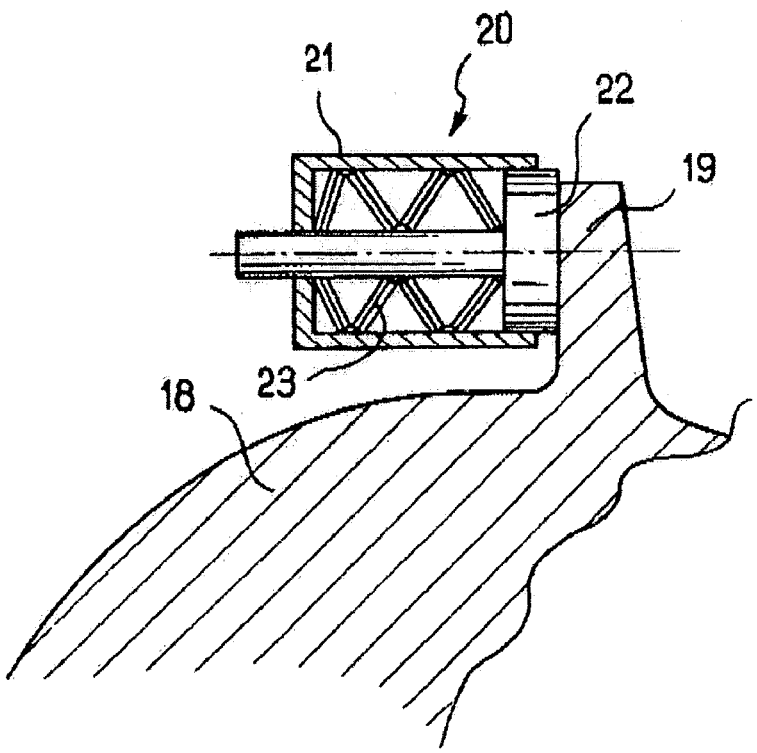
FIG. 4 is a section view along line IV—IV of a detail of the device of FIG. 3.
Figure 5:
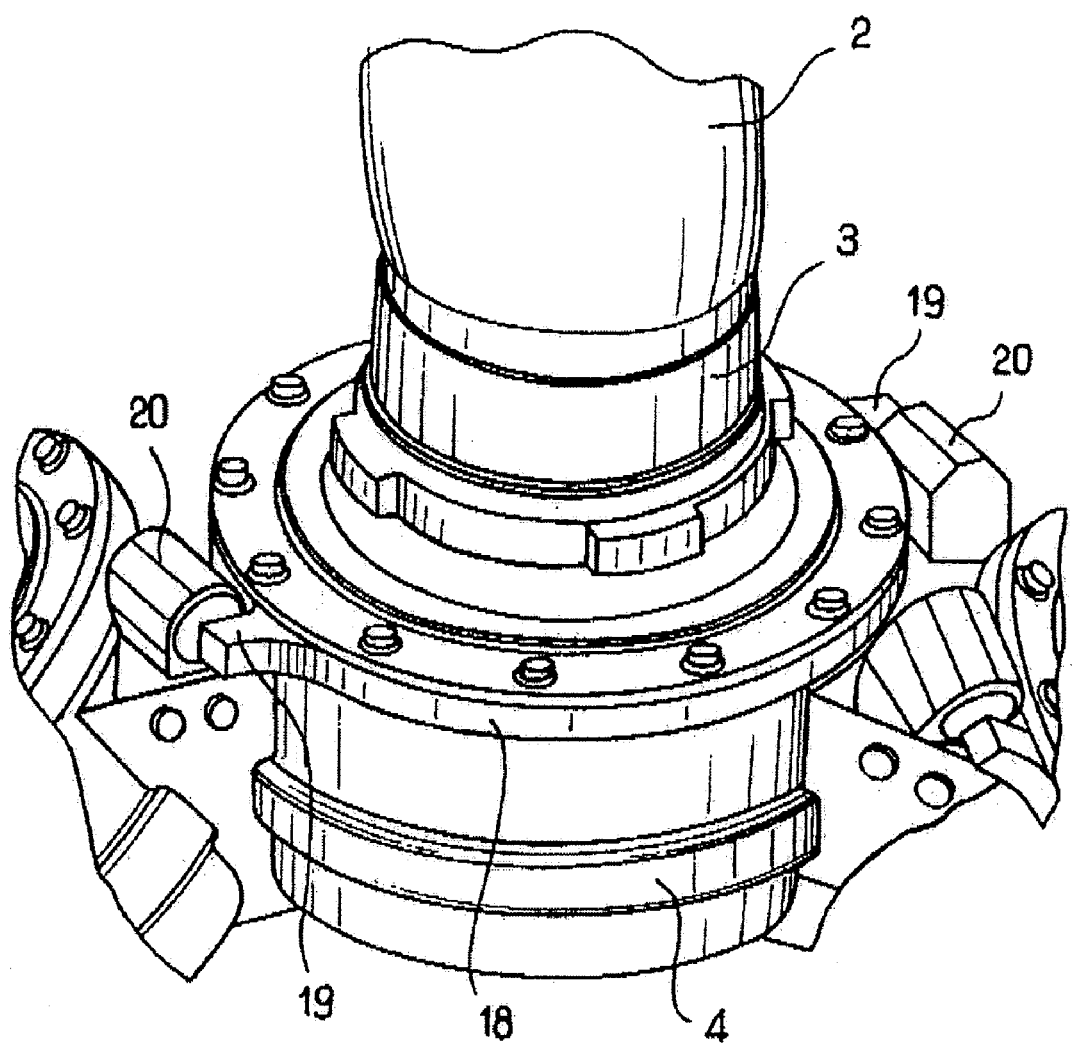
FIG. 5 is a schematic perspective view of a blade base installed in a hub conforming to the invention.

The structure of the holding ring of the invention, which is only shown schematically in FIG. 1, is shown in detail in FIGS. 3 to 5. Ring 11 and hub 4, at the level of the blade base housing, have shapes that are respectively adapted to permit axial movement of ring 11 relative to hub 4. According to the invention, the axial displacement is induced by rotation of ring 11, which is mounted for this purpose in hub 4 by means of a rolling component 15 cooperating with two conjugated tracks 16 and 17 formed on ring 11 and on hub 4, respectively, the two tracks 16, 17 constituting a helical guide path by means of which a rotation of ring 11 is accompanied by an axial translation of ring 11 relative to hub 4. This translation therefore more or less loads the two bearing 5 and 6. These rolling elements 15 shown are balls, but it is clear that they can be balls, rollers, alternating rollers, recycled or not. The absence of recycling is possible due to the fact that the low amplitude of axial movement. In a manner known in itself, it is possible to provide cages connecting the roller elements together, and these cages are made of flexible material, so as to facilitate mounting.

Ring 11 has a part forming a stay 18, on which a radial extension 19 is formed, preferably two extensions (see FIG. 5), serving for support at a preloading device 20 mounted on hub 4 and designed to continuously cause ring 11 to rotate, and therefore, by helical transformation, to continuously induce a preloading on the two bearings 5 and 6. Device 20 shown is FIG. 4 is simply constituted by a casing 21 of one piece with hub 4 and comprising a piston 22 pressed against radial extension 19 of the ring by an elastic device 23. This device can be made of springs, Schnorr washers, or any elastic elements or elements permitting a support force conforming to a certain defined preloading law to be obtained. Advantageously, a damping is provided. Taking into account the reversibility of rolling elements 15, the preloading will be independent of differential expansions and other disruptions. Preloading device 20 also can be designed to vary the preloading as a function of the particular conditions: for example, a connection with the rotating component (the blade) can permit varying the preloading as a function of the angular position of the blade. In a general way, a servomotor can be used for device 20, more easily permitting the preloading to be varied as a function of the conditions of use, by introducing a force following a predefined law.

I claim:

1. A device for mounting a propeller blade in a hub, of the type in which a blade base is mounted in rotation in a housing of a hub by means of at least two bearings, and where a preloading device permitting axially preloading said at least two bearings comprises a holding ring mounted between one of said at least two bearings and said hub so as to allow an axial displacement of said ring relative to said hub, wherein said holding ring is mounted rotatingly between said bearing and said hub by means of rolling elements and helical tracks arranged to drive an axial displacement of said holding ring during a rotation of said holding ring, preloading means being provided to cause said ring to rotate according to a predefined law.

2. The device according to claim 1, wherein said preloading means are of one piece with said hub.

3. The device according to claim 2, wherein said means comprise a mobile support element being supported on said ring to continuously cause it to rotate.

4. The device according to claim 3, wherein said support element is supported roughly tangentially on said ring.

5. The device according to claim 4, wherein said support element is supported on a radial extension of said ring.

6. The device according to claim 3, wherein said support element is caused to rotate by an elastic element or by a servomotor.

7. The device according to claim 1, wherein ring is mounted between a conical roller bearing and hub.

* * * * *